US012699059B2

(12) United States Patent
Giudiceandrea et al.

(10) Patent No.: US 12,699,059 B2
(45) Date of Patent: *Aug. 4, 2026

(54) INDUSTRIAL TOMOGRAPHY APPARATUS AND METHOD FOR CHECKING THE COMPOSITION OF INDUSTRIAL PRODUCTS WHICH COMPRISE A PLURALITY OF PRIMARY PARTS

(71) Applicant: BIOMETIC S.R.L., Bressanone (IT)

(72) Inventors: Arianna Giudiceandrea, Bressanone (IT); Enrico Ursella, Mestre (IT); Giancarlo Zane, Mestre (IT)

(73) Assignee: BIOMETIC S.R.L., Bressanone (IT)

( * ) Notice: Subject to any disclaimer, the term of this patent is extended or adjusted under 35 U.S.C. 154(b) by 108 days.

This patent is subject to a terminal disclaimer.

(21) Appl. No.: 18/790,456

(22) Filed: Jul. 31, 2024

(65) Prior Publication Data

US 2024/0393265 A1 Nov. 28, 2024

Related U.S. Application Data

(63) Continuation of application No. 17/387,174, filed on Jul. 28, 2021, now Pat. No. 12,092,590.

(30) Foreign Application Priority Data

Aug. 4, 2020 (IT) ........................ 102020000019243

(51) Int. Cl.
G01N 23/046 (2018.01)
G01N 23/18 (2018.01)
(Continued)

(52) U.S. Cl.
CPC ........... G01N 23/046 (2013.01); G01N 23/18 (2013.01); G06T 7/0004 (2013.01); G06T 15/08 (2013.01); G06T 17/00 (2013.01)

(58) Field of Classification Search
CPC . G06T 7/0004; G06T 7/62; G06T 7/11; G06T 17/00; G06T 15/08;
(Continued)

(56) References Cited

U.S. PATENT DOCUMENTS 9,816,949 B2 11/2017 Santini
10,481,108 B2 11/2019 Ferro
(Continued)

FOREIGN PATENT DOCUMENTS

EP 2405260 A1 1/2012
WO 9718462 A1 5/1997

OTHER PUBLICATIONS

Hindelang, Florine, et al., "Micro Computer Tomography for Medical Device and Pharmaceutical Packaging Analysis", Journal of Pharmaceutical and Biomedical Analysis, Esvier B.V., Amsterdam, Netherlands, vol. 108, Feb. 9, 2015, pp. 38-48.
(Continued)

*Primary Examiner* — Sang H Nguyen
(74) *Attorney, Agent, or Firm* — Chrisman Gallo Tochtrop LLC

(57) ABSTRACT

An industrial tomography apparatus (1) comprising a tomography scan device (7) configured to perform tomography scans of the products (2) placed in a scanning zone (4), and an electronic processing unit operatively connected to the tomography scan device (7) for receiving from it digital data about the tomography scans performed by the tomography scan device (7), and programmed to generate, using that digital data, a virtual three-dimensional tomography model (8) of a product (2) scanned by the tomography scan device (7), the virtual three-dimensional tomography model (8) being constituted of a plurality of voxels each of which has its own constant density. In accordance with the method for checking the composition of the products (2), the fol-
(Continued)

lowing are performed: a tomography scan step by means of the tomography apparatus (1) inserted in a production line (15), and a step of computerised analysis of the virtual three-dimensional tomography model (8), wherein there is assessment of predetermined properties of the primary parts of the product (2) to which the virtual three-dimensional tomography model (8) corresponds.

9 Claims, 8 Drawing Sheets

(51) Int. Cl.
    *G06T 7/00*         (2017.01)
    *G06T 15/08*       (2011.01)
    *G06T 17/00*       (2006.01)

(58) Field of Classification Search
    CPC . G06T 2207/20084; G06T 2207/30128; G06T
               2207/20081; G06T 2207/10081; G06N
               3/08; G01N 23/046; G01N 23/18
    See application file for complete search history.

(56) References Cited

U.S. PATENT DOCUMENTS

| | | |
|---|---|---|
| 2008/0260096 A1 | 10/2008 | Sommer |
| 2011/0050880 A1 | 3/2011 | Bourg, Jr. |
| 2012/0034349 A1* | 2/2012 | Jing ........................ G06T 7/155 |
| | | 426/231 |
| 2016/0019688 A1 | 1/2016 | Li |
| 2016/0178539 A1 | 6/2016 | Santini |
| 2016/0305895 A1 | 10/2016 | Ferro |
| 2017/0352150 A1 | 12/2017 | Magana |
| 2017/0357857 A1 | 12/2017 | Perron |
| 2018/0113083 A1 | 4/2018 | Van Dael |
| 2018/0209922 A1* | 7/2018 | Yamakawa .......... G01N 23/083 |
| 2019/0137421 A1 | 5/2019 | Ferro |
| 2019/0325570 A1 | 10/2019 | Wenzel |
| 2020/0116877 A1* | 4/2020 | Saito ...................... G01N 33/12 |

OTHER PUBLICATIONS

Chandiramani, Sumita, "Micro-CT Examination of Seal Integrity in Glass Vials", Retrieved from Internet: URL: https://www.microphotonics.com/micro-ct-examination-of-seal-integrity-in-glass-vials/ (retrieved on Mar. 22, 2021).

Cao, Wenchao, et al., "An Improvised Segmentation Method for Multi-Material Beam Hardening Correction in Industrial X-Ray Computed Tomography", Measurement Science and Technology, vol. 30.12, 2019, 125403, 23 pages.

\* cited by examiner

8

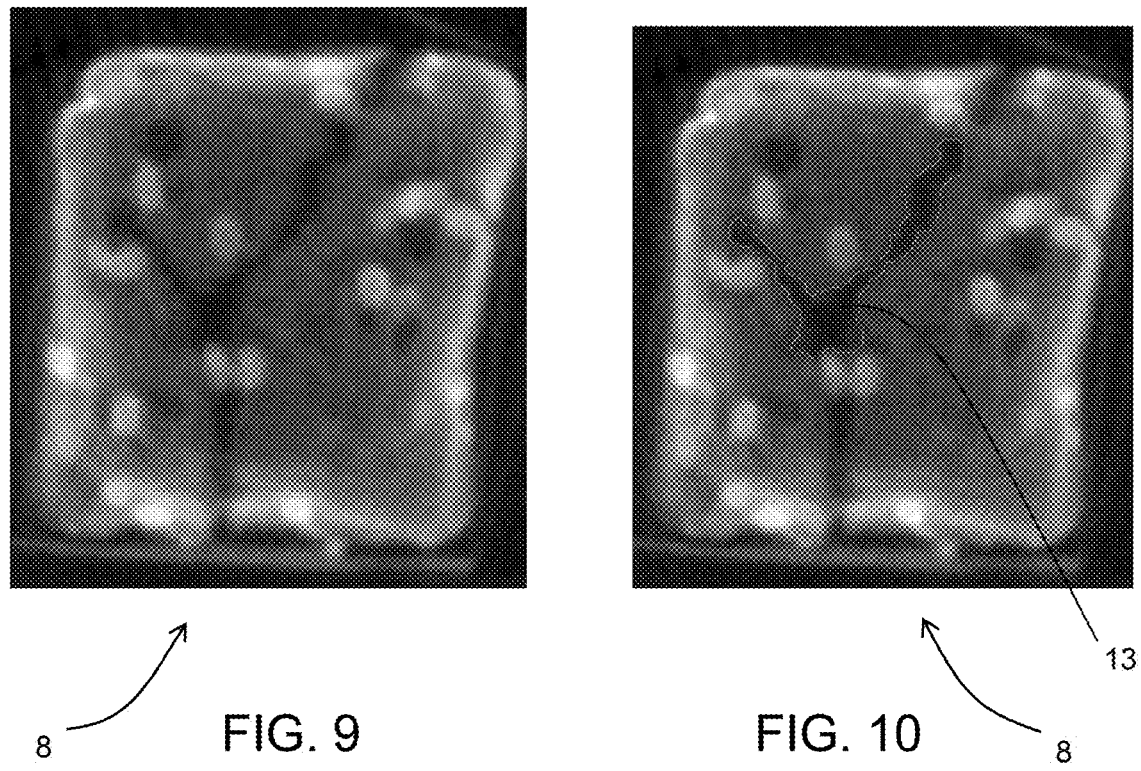
FIG. 9
FIG. 10
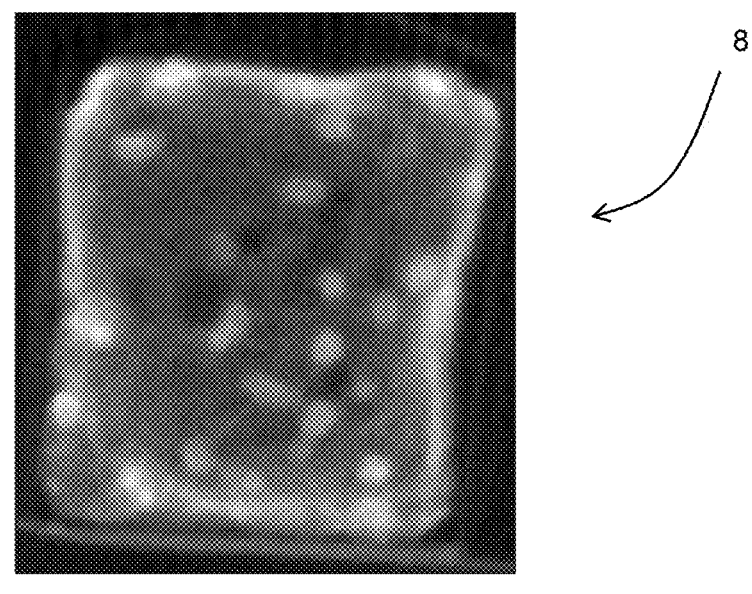
FIG. 11

INDUSTRIAL TOMOGRAPHY APPARATUS AND METHOD FOR CHECKING THE COMPOSITION OF INDUSTRIAL PRODUCTS WHICH COMPRISE A PLURALITY OF PRIMARY PARTS

CROSS-REFERENCE TO RELATED APPLICATIONS

This application is a continuation of U.S. application Ser. No. 17/387,174, filed Jul. 28, 2021, which claims the priority of Italian Patent Application No. 102020000019243, filed Aug. 4, 2020, both of which are incorporated herein by reference in their entirety.

This invention relates to an industrial tomography apparatus and a method for checking the composition of industrial products which comprise a plurality of primary parts.

In the context of this invention, the definition industrial product is used to identify any product which is industrially made and/or packaged. One of the preferred fields of application is the food sector, but this invention may be applied in the most diverse sectors, as will be clear from the following description.

The definition product which comprises a plurality of primary parts means any product in which parts are identifiable which, at macroscopic level, are distinct and distinguishable from each other. For example such parts may have different composition, and/or different shape, and/or different dimensions. Again by way of example, the various primary parts may be in contact with each other or separate from each other, and they may or may not adhere to each other. Each primary part may or may not have a predetermined shape, and may be solid, liquid or in the form of a gel.

In some applications of this invention, the product is composed of primary parts which are (or rather, should be) assembled in a predetermined way, that is to say, positioned and/or connected in a predetermined way relative to each other.

A first possible example is that of a tub of ice cream in which, theoretically, there must be a predetermined number of pieces of chocolate mixed with the ice cream, and in which those pieces must be of a predetermined size and must be evenly distributed in the ice cream.

A second possible example is that of a cake which, theoretically, must have cherries at predetermined positions, as well as the correct quantity of sponge cake and cream, alternating in the correct way.

Similar considerations apply for pizzas, snacks, single-portion packaged ice creams and so on.

The same assessments may even apply for foods packaged in a preserving liquid, such as peeled tomatoes, mozzarella cheeses, pickles, etc.

Again in the context of the first possible application of this invention, in a non-food sector the products which may be affected are even more varied: they may range from a fountain pen to a vacuum cleaner, etc.

In a second application of this invention, the product is composed of primary parts which are not assembled, but which are (or rather, should be) present in predetermined quantities.

In the food sector these may be, for example, a bag containing a dried fruit and nut mix which must contain a correct quantity of each type of fruit and nut, or a packet of mixed biscuits. The same applies in the case of a bag of muesli. In contrast, in the non-food sector they could be, for example, a bag of screws and nuts, a bag of hardware for furniture to be assembled, a packet of toy building blocks such as Lego® bricks, etc.

In other applications of this invention, in contrast the primary parts may all be the same as each other, for example in the case of a pack of pasta, a pack of crackers, a pack of crispbreads, a packet of plastic components for furniture factories, etc.

As already indicated, for many products constituted of primary parts, there may be requirements to be met during the production/packaging step in order to be able to best satisfy the demands of customers and the company.

In some cases, it is important that the product comprises all of the various primary parts in the correct position, with the correct dimensions and with the correct quantities and/or distribution. Few pieces of chocolate in the ice cream may leave the customer unsatisfied, whilst too many pieces of chocolate may involve a cost that is too high for the company. Similarly, in the case of a cake, if the cherries used to garnish it are covered by the cream, the appearance of the cake is compromised, as it is if there are extra cherries in wrong positions. In contrast, in some cases it is only important that the product comprises precisely the parts which it must contain; not fewer parts (to avoid making the customer unhappy), nor extra parts (which would simply be a waste from the viewpoint of the company). Consider for example a bag of screws and nuts, a bag of hardware for furniture to be assembled, building blocks, etc.

In other cases, in contrast what is important is to guarantee the integrity of the various parts of which the product consists; for example it is important to ascertain if a pack of crispbreads contains broken crispbreads, just as it is important to ascertain if all of the blocks of a game, or a set of components for furniture, are intact.

Although the problems indicated above have been known and experienced for a very long time, until now companies have been able to face them by simply attempting to increasingly improve the production lines with the aim of minimising the occurrence of unwanted production/packaging errors. Furthermore, sampling checks have been proposed, to verify products a posteriori in a statistical way and to understand which interventions should be performed on the production plants if necessary.

In contrast, as far as the Applicant is aware, until now on the market there are no known methods or apparatuses for checking a posteriori in an effective and systematic way the entire production of industrial products comprising a plurality of primary parts, with the aim of identifying any products which do not meet the expected requirements.

In this context, the technical purpose which forms the basis of this invention is to overcome the above-mentioned disadvantages.

In particular, the technical purpose of this invention is to make an apparatus and provide a method for checking the composition of industrial products which comprise a plurality of primary parts.

It is also the technical purpose of this invention to make an apparatus and to provide a method for checking the composition of industrial products, which allow verification with good precision, of the correct positioning relative to each other of the various primary parts and/or the correct quantity of each type of primary parts and/or the integrity of the various primary parts and/or the presence of the correct primary parts and/or the absence of element which are not expected.

The technical purpose specified and the aims indicated are substantially achieved by an industrial tomography apparatus and a method for checking the composition of industrial products which comprise a plurality of primary parts, as described in the appended claims.

Further features and the advantages of this invention are more apparent in the detailed description, with reference to the accompanying drawings which illustrate several preferred, non-limiting embodiments, in which:

FIG. 9 shows a front view of a virtual three-dimensional tomography model of a broken crispbread;

Figure 12:
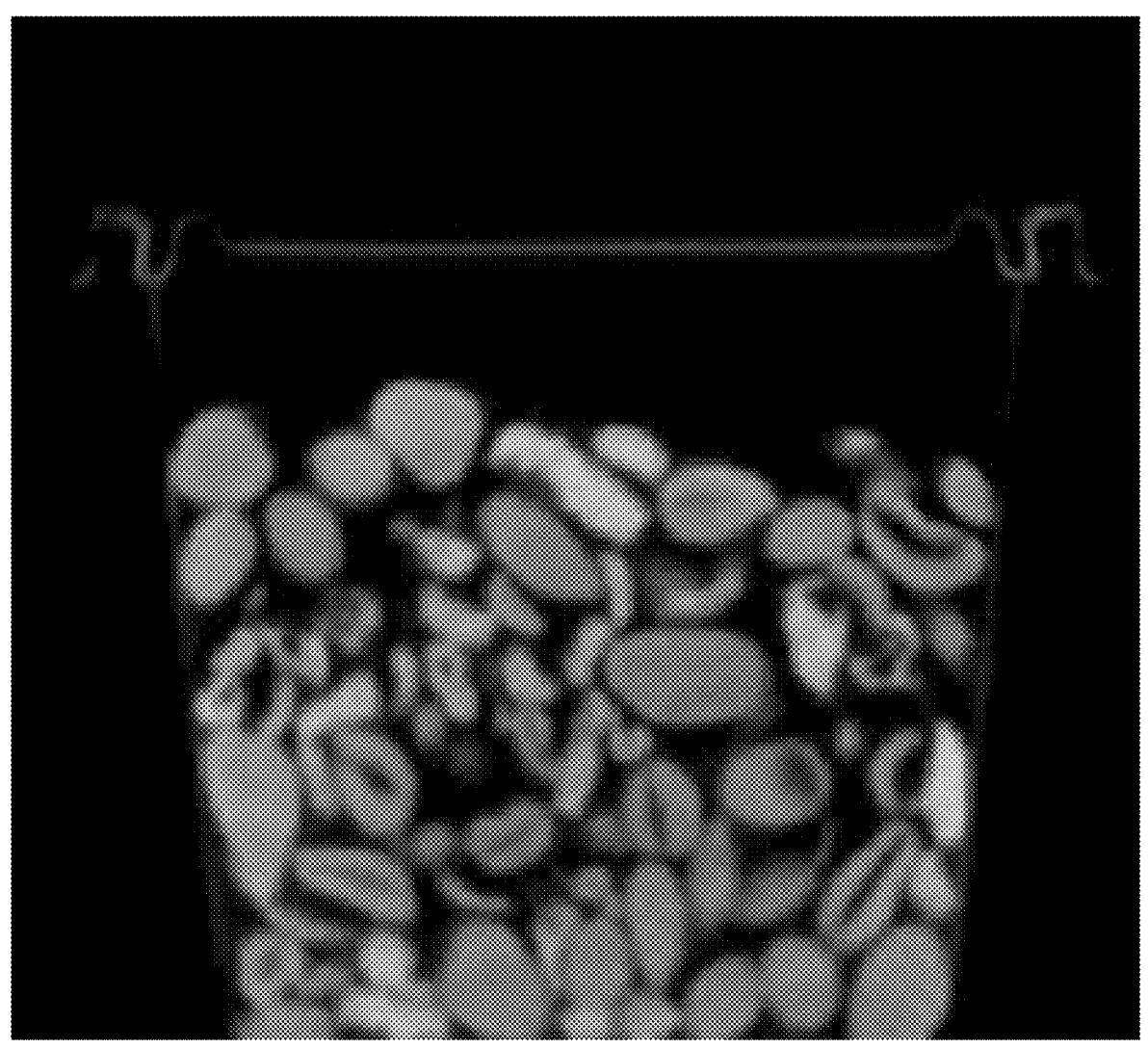
Figure 13:
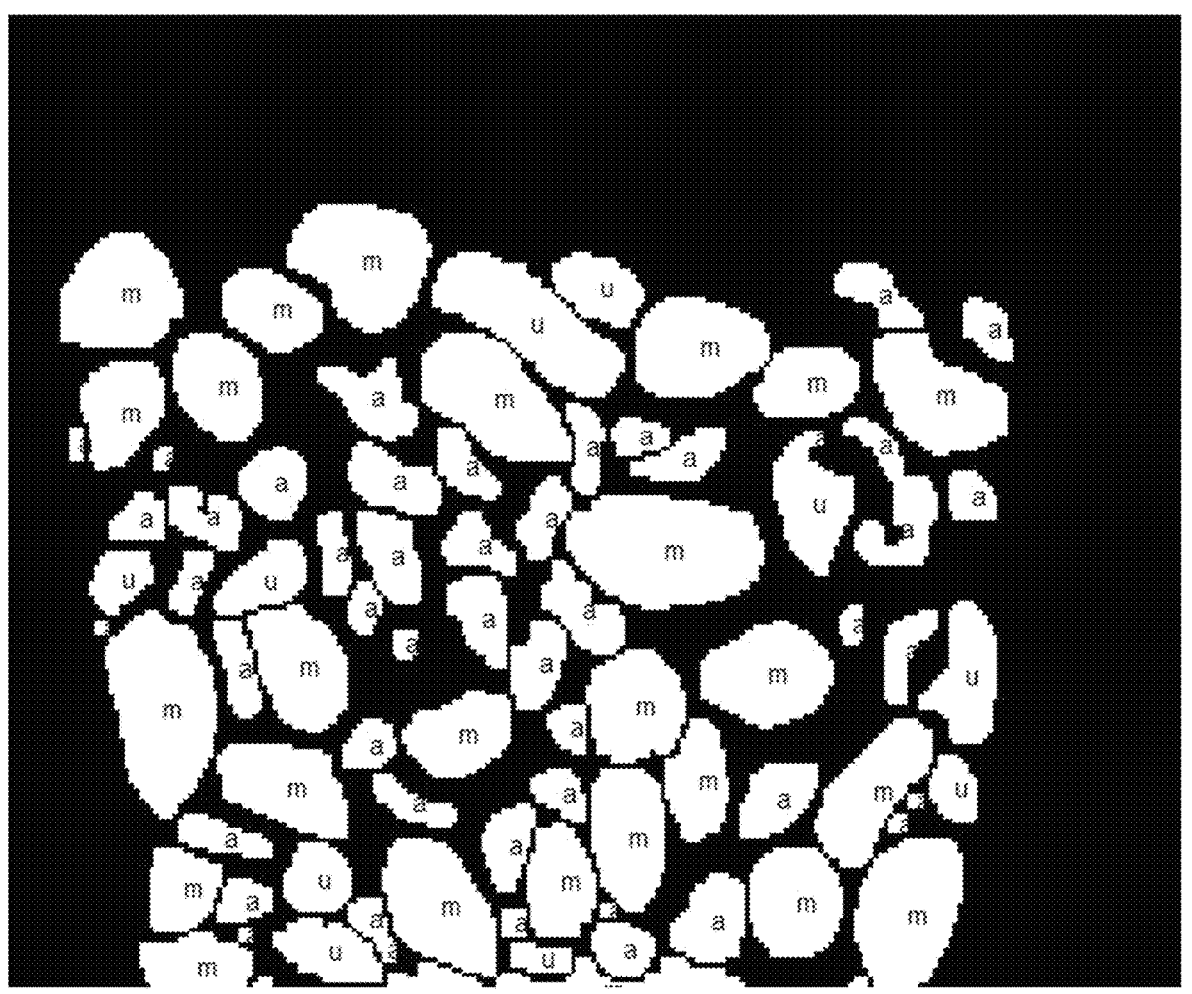
Figures 14, 15, 16:
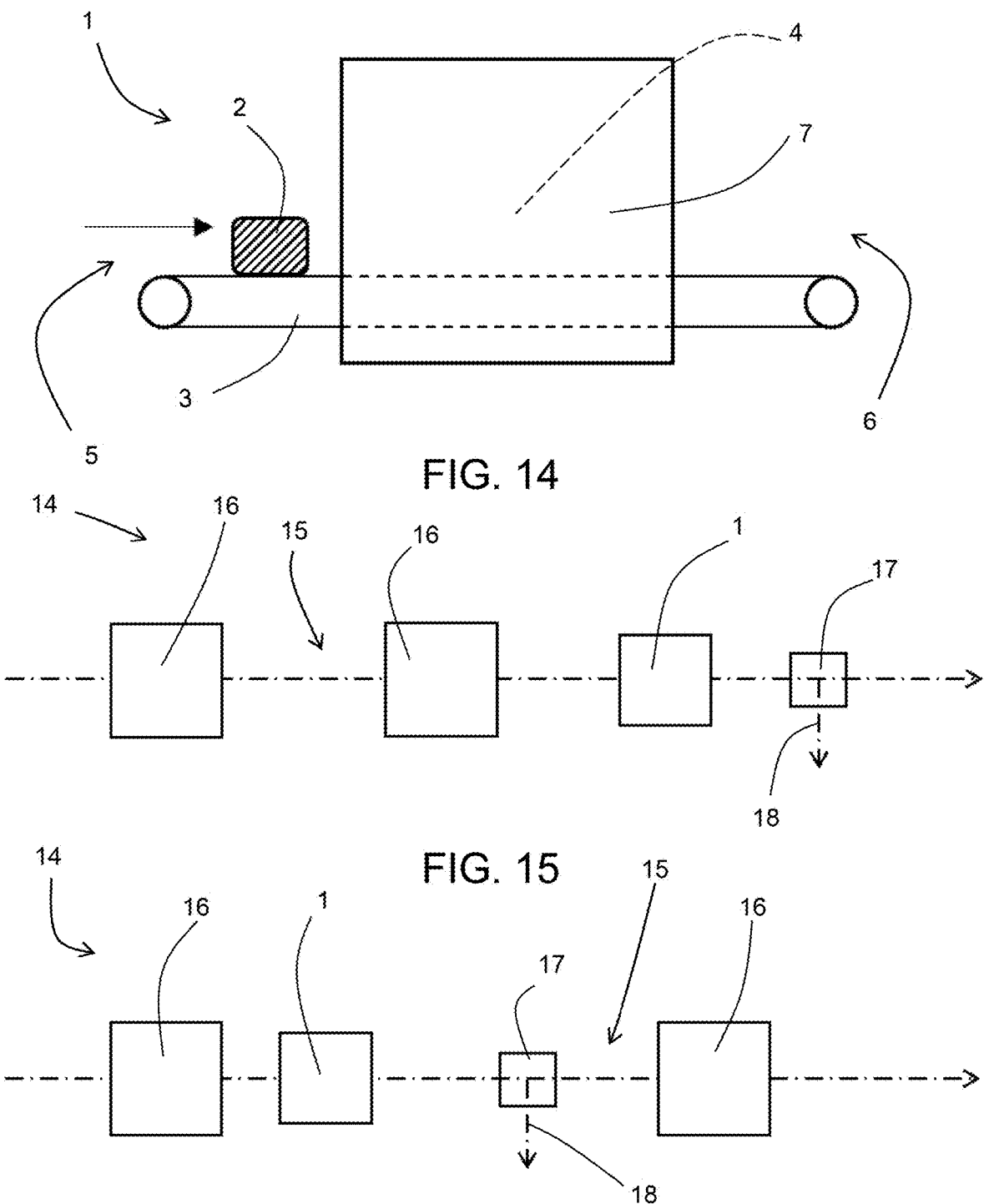

FIG. 10 highlights the presence of a breakage zone in the virtual three-dimensional tomography model of FIG. 9;

FIG. 11 shows a front view of a virtual three-dimensional tomography model of an intact crispbread;

FIG. 12 shows an axial section of a virtual three-dimensional tomography model of a packet of mixed dried fruit and nuts;

FIG. 13 shows the same model as FIG. 12, segmented to identify a plurality of different fruit and nuts of which it is constituted;

FIG. 14 shows an in line version of the tomography apparatus according to this invention;

FIGS. 15 and 16 show two layouts of industrial plants which comprise a tomography apparatus according to this invention.

The following is a description initially of an industrial tomography apparatus made according to this invention and then of the method according to this invention. In any case, since the apparatus is capable of implementing the method according to this invention, what will be described relative to the tomography apparatus shall be understood to also apply for the method, and vice versa, if technically compatible. In fact, it shall be understood that particular embodiments of the apparatus will be capable of implementing only specific embodiments of the method, and that particular embodiments of the method can be implemented exclusively by specific embodiments of the apparatus.

The industrial tomography apparatus 1 according to this invention is a tomography apparatus specifically intended for analysing one or more products 2 of known type, and in particular products 2 of known type which comprise (and at least in some cases are constituted of) a plurality of primary parts. Such products 2 of known type, hereinafter referred to simply as "products", have known features, both as a whole (for example: overall size, list of primary parts of which they are composed), and as regards the individual primary parts of which they are composed (for example: number and/or volume of each type of primary part, position of the parts relative to each other, dimensions of each primary part)

In any case, it should be noticed that, in the context of this invention, when reference is made to known features of the products 2 the intention is to refer to the theoretical features which the products 2 should have, that is to say, to the features of products 2 which reflect the production and/or packaging specifications. In contrast, as will be seen below, what this invention allows is a true verification, on the finished product 2, of whether or not said specifications are met.

The apparatus comprises first a conveying device 3 which is configured to feed the products 2 to be inspected to a scanning zone 4, and then to remove the products 2 from the scanning zone 4. Advantageously, the conveying device 3 moves in one direction from an infeed zone 5 to an outfeed zone 6 (FIG. 14), through the scanning zone 4.

At the scanning zone 4 there is a tomography scan device 7, which is configured to perform tomography scans of what is located in the scanning zone 4 and, in particular, of the industrial products 2 of interest. In the known way, the tomography scan device 7 comprises an x-ray emitter and an x-ray detector (which are not illustrated) placed on opposite sides of the scanning zone 4, and a movement system (also not illustrated) for making the product 2 rotate relative to the emitter and receiver (preferred solution) or vice versa. Since these are technical solutions known to experts in the sector, they will not be described in detail herein.

The tomography apparatus 1 also comprises an electronic processing unit (not illustrated) which is operatively connected to the tomography scan device 7, for receiving from it digital data about the tomography scans performed by the tomography scan device 7, from different relative angles relative to the object.

The electronic processing unit is programmed, in the known way, to use the digital data to generate a virtual three-dimensional tomography model (in electronic format) of each product 2 scanned by the tomography scan device 7. In an equally known way, the virtual three-dimensional tomography model 8 is constituted of a plurality of voxels (primary volumes), each of which is assumed to have its own constant density. Therefore, in the known way, associated with each voxel there is a value which is representative of the density of the voxel (CT Number). It should be noticed that the CT Number does not express the density in g/dm$^3$, but the value in g/dm$^3$ may generally be calculated provided that one knows the material of which the voxel is composed (for example chocolate, iron, etc.); in fact, for that purpose there are specific known beam-hardening correction algorithms (for example, see what is described in Cao, Wenchao, et al. "An improved segmentation method for multi-material beam hardening correction in industrial x-ray computed tomography." Measurement Science and Technology 30.12 (2019): 125403).

In this way it is possible to use the system even for calculating the weight/the mass of the individual voxels if their volume is known. Hereinafter when reference is made to the mass of groups of voxels, it will be possible to calculate it in this way or, more simply, since they are products with known features, even by multiplying the volume of the voxels by a known average density value for that specific primary part of the product 2. It will be possible to select the dimensions of the voxels based on the dimensions of the product 2 to be inspected; in general they will be small enough to allow the obtainment of a sufficiently detailed and precise reconstruction. The virtual three-dimensional tomography model 8 is then advantageously saved in an electronic memory associated with the electronic processing unit.

According to a first innovative aspect of this invention, the electronic processing unit is also programmed to perform a procedure for inspecting the composition of the products 2 of known type to which the industrial tomography apparatus 1 is dedicated.

In particular, during the inspection procedure performed by it, the electronic processing unit inspects the virtual three-dimensional tomography model 8 of each product 2, to assess predetermined properties of the primary parts of the product 2.

In the context of this invention, predetermined properties means one or more properties set during the step of programming the electronic processing unit. Those predetermined properties may for example be dimensions, volumes, positions, etc.

In the preferred embodiments, the electronic processing unit assesses at least one of the following predetermined properties:

the position of one or more primary parts inside the product 2. Some examples of this type are: the correct positioning of parts of assembled complex products 2; the position of garnishing cherries on cakes or ice creams; and the total number of primary parts of a same type inside the product 2. Some examples of this type are: the number of nuts or screws inside a bag; the number of each type of component in a bag of hardware for furniture to be assembled; the number of each type of blocks inside a box of toy blocks.

Further predetermined properties which could be assessed are:

the dimensions of one or more primary parts. Some examples of this type are: the thickness of a layer of a cake; the dimensions of the pieces of chocolate distributed in an ice cream;

the shape of one or more primary parts. Some examples of this type are: the shape of screws and nuts, the shape of toy blocks, the shape of biscuits inside a pack, the shape of a top garnish of an ice cream.

the volume or the mass of one or more primary parts. Some examples of this type are: the volume/the mass of solid food preserved in a preserving liquid, the quantity of syrup in a single-or multi-portion tub of ice cream;

the total volume or mass of primary parts of a same type inside the product 2. Some examples of this type are: the total volume or mass of chocolate present in a tub of ice cream; the total volume or mass of each type of dried fruit and nuts in a bag of mixed dried fruit and nuts.

the integrity of one or more primary parts relative to a predetermined shape which said one or more primary parts should have. Some examples of this type are: the integrity of crispbreads, crackers or biscuits; the integrity of plastic components;

the presence, in predetermined zones of the product 2, of densities which are different from an expected density, which indicate the presence of unwanted elements or of unexpected empty zones (for example due to breakage of a primary part, for example a crispbread);

the presence of primary parts which are not expected for the product 2, which indicate the presence of extra primary parts or of extraneous elements (this specific case is similar to the preceding one).

In some embodiments, the inspection procedure which the electronic processing unit is programmed to perform for each product 2 of known type, comprises a sequence of operating steps programmed in the electronic processing unit. The most general solution in particular comprises a segmentation step, an assessment step, a comparison step and a classification step.

When it performs the segmentation step, the electronic processing unit identifies in the virtual three-dimensional tomography model 8 a plurality of primary volumes 9 (also obviously virtual) which each correspond to one of the primary parts which constitute the real product 2. Each primary volume 9 is constituted of voxels of the virtual three-dimensional tomography model 8, which are adjacent to each other and which have respective densities inside a same predetermined range of densities. Since the nature and the composition of the primary parts of each product 2 are known beforehand, each range of densities will be selected, during the step of programming the electronic processing unit, in such a way as to correspond to the average density of a specific primary part with a predetermined tolerance (for example, average density ±5%), that is to say, in such a way as to correspond to a known range of densities of one of the primary parts which constitute the product 2. Alternatively, each range of densities may even be selected by directly processing the image (for example starting from an average value of either densities of the primary parts or density of the air—see the discussion of FIG. 8 below).

Even the information about each primary volume 9 identified may then be saved.

In some embodiments, during the segmentation step, the electronic processing unit identifies a primary volume 9 by simply selecting, for that primary volume 9, all of the adjacent voxels which have densities inside the relative predetermined range of densities. This is possible in all cases in which, according to the known features of the product 2, it is known beforehand that said specific primary part is always constituted of a single volume (for example: the ice cream in which the pieces of chocolate are distributed or the container which contains the other primary parts of the product 2).

Figure 6:
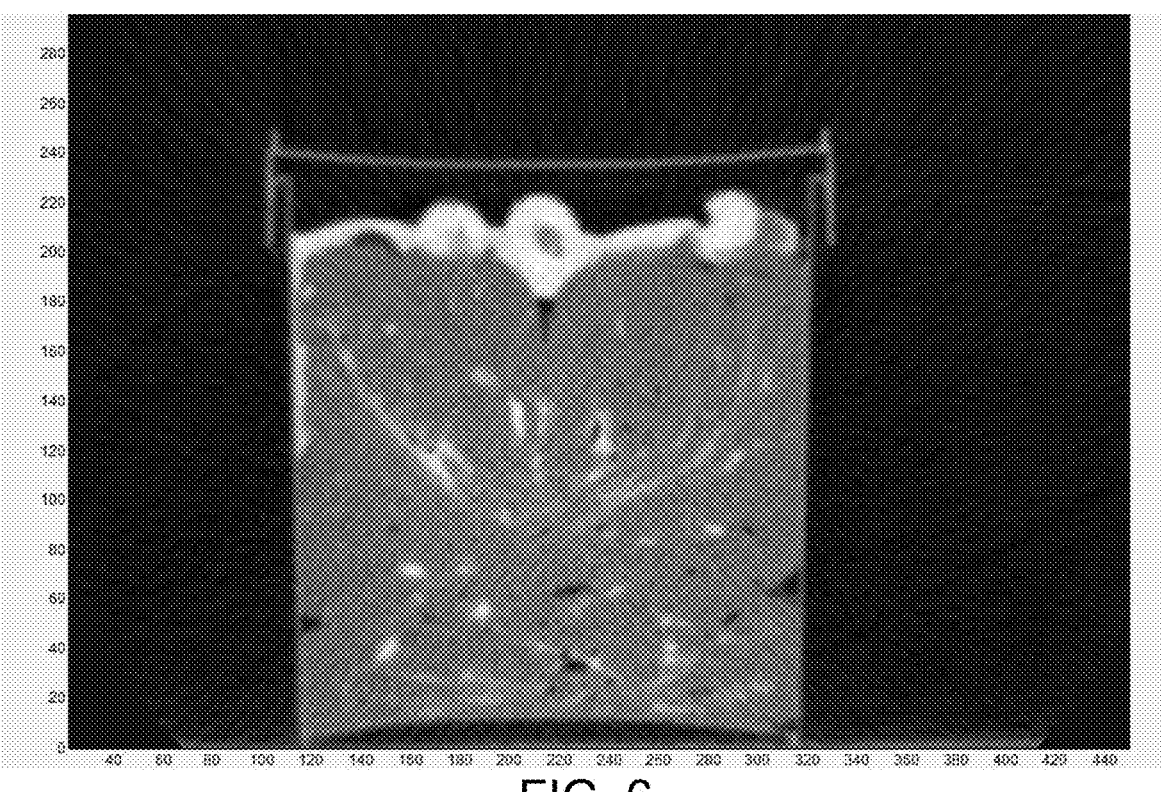
FIG. 6 shows an axial section of the virtual three-dimensional tomography model of FIG. 1.
Figure 7:
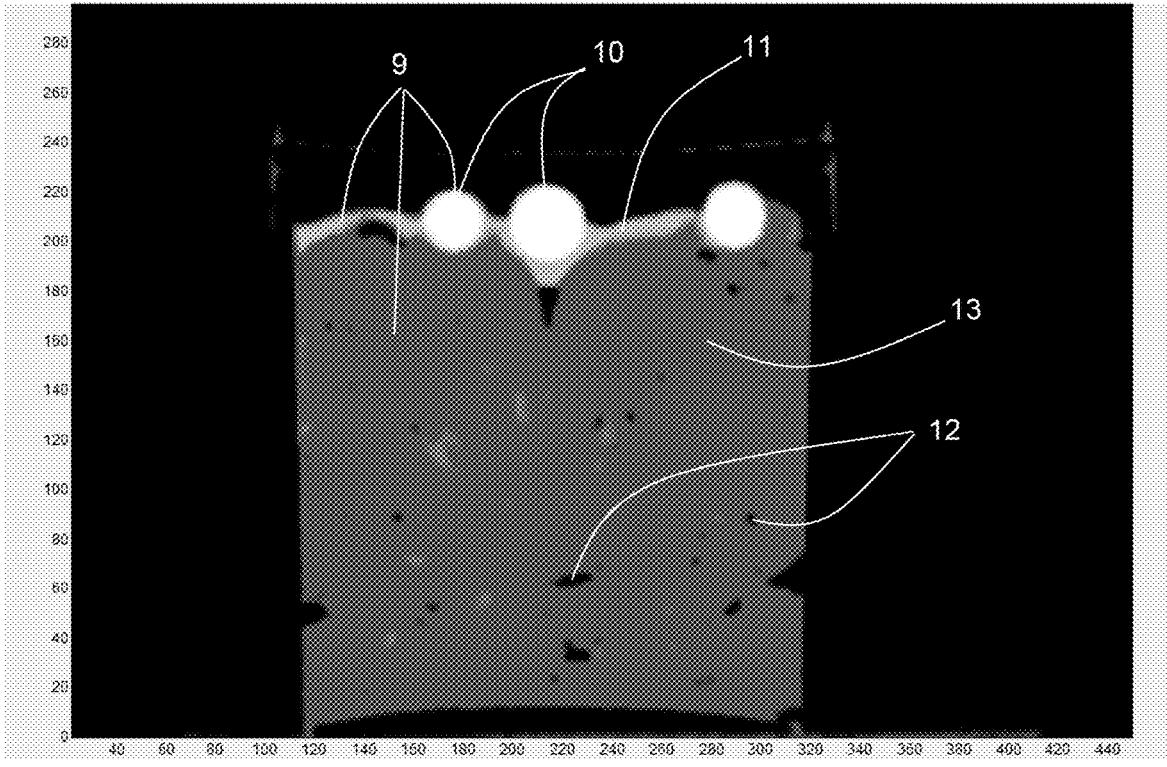
FIG. 7 shows a segmentation of the image of FIG. 6.

In contrast, in other embodiments, the segmentation step performed as just described does not allow direct identification of the individual primary volume 9; that applies in particular when multiple primary parts of a same type in contact with each other are present, or when distinct primary parts are present, but with very similar densities. In these cases, performing the segmentation step comprises first the electronic processing unit selecting all adjacent voxels which have densities inside the expected predetermined range of densities, according to the methods described above, thereby identifying a secondary volume which will be known to be constituted of a plurality of primary volumes 9. Then the electronic processing unit divides the secondary volume into the plurality of primary volumes 9 of which it is constituted, for that purpose using information saved about known aspects of the primary parts to which the primary volumes 9 must correspond. Such known aspects may be the shape, the dimensions or the position of the primary parts inside the product 2. For example, in the case of an ice cream garnished on top with sour black cherry syrup (like that in FIGS. 1 to 5), since the sour black cherries may be in contact with each other and may be partly immersed in the syrup, and since the syrup has a density very similar to the sour black cherries (see FIG. 6), in order to identify the sour black cherries it is possible to use the known information that each sour black cherry can be modelled roughly as a high density sphere, with a central zone which is empty, therefore has much lower density. Using this information the electronic unit can first find the centres of the sour black cherries in a robust way and, then, find the diameter of the sour black cherry best suited to the upper part of it, an upper part which it may be assumed is not covered by syrup. The result is shown in FIG. 7.

In a similar way, it is easy to distinguish between screws and nuts by identifying inside the secondary volume, primary volumes 9 having the shape of a screw or nut.

Figure 8:
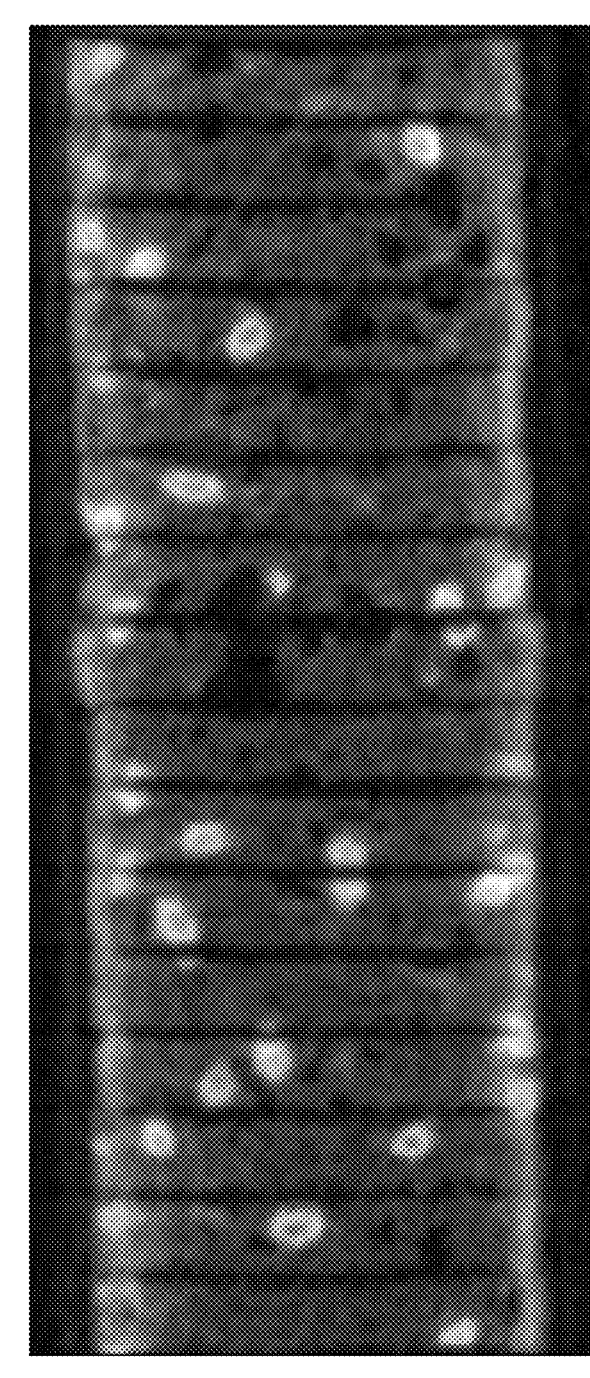
FIG. 8 shows a plan view of a virtual three-dimensional tomography model of a pack of crispbreads.

Moreover, once the arrangement of crispbreads inside a pack is known, and the thickness of the individual crispbreads, it is easy to distinguish them from each other even if they are in contact with each other (FIG. 8).

The two embodiments just described may also be used by the electronic processing unit of a single apparatus, for different types of primary parts of a single product 2.

Moreover, in some embodiments, during the segmentation step the electronic unit may also identify residual primary volumes 9 by simply selecting all of the adjacent voxels which have a density different from that of the air and outside all of the expected predetermined ranges of densities.

Depending on the type of product 2 inspected, it is also possible that during the segmentation step the electronic processing unit performs a preliminary division of the virtual three-dimensional tomography model 8 into multiple smaller models, for example identifying different portions of the product 2 which are separated by air (as in the case of the crispbreads in FIGS. 8 to 11).

During the assessment step, the electronic processing unit then assesses one or more predetermined properties, of one or more of the primary volumes 9 identified during the segmentation step. Regarding the predetermined properties of the primary volumes 9 identified in the virtual three-dimensional tomography model 8, the same considerations set out above also apply for the primary parts of the product 2 to which the primary volumes 9 correspond, since in the virtual three-dimensional tomography model 8 the primary volumes 9 correspond to the primary parts in the real product 2.

Then, the electronic processing unit is programmed to perform the comparison step, during which it compares the predetermined properties assessed during the assessment step, with corresponding reference values saved in an electronic memory associated with the electronic processing unit. The reference values are simply the quantification of reference predetermined properties which correspond to a product 2 which reflects the production specifications. The aim of the comparison step is to verify if there is a match between the predetermined properties assessed during the assessment step and the reference values saved.

As regards possible practical implementations of the assessment and comparison steps, those which correspond to the above indicated predetermined properties are listed below.

In some embodiments, the electronic processing unit assesses and compares the position of one or more primary volumes 9 inside the product 2. For example it may assess and compare the position of garnishing elements in food products 2, or the presence at the correct point of the individual parts of an assembled product 2.

In some embodiments, the electronic processing unit assesses and compares the total number of primary volumes 9 of a same type inside the product 2. For example it may assess and compare the total number of screws and nuts present in a bag.

Here below other possible practical implementations of the assessment and comparison steps.

In some embodiments, the electronic processing unit assesses and compares the dimensions of one or more primary volumes 9. For example it may assess and compare the thickness of a layer of a cake.

In some embodiments, the electronic processing unit assesses and compares the shape of one or more primary volumes 9. For example it may assess and compare the shape of an ice cream.

In some embodiments, the electronic processing unit assesses and compares the volume of one or more primary volumes 9. For example it may assess and compare the volume of syrup in an ice cream, or the volume of each individual piece of chocolate. Alternatively, it may also assess the corresponding masses of the one or more primary volumes (9).

In some embodiments, the electronic processing unit assesses and compares the total mass or volume of primary volumes 9 of a same type inside the product 2. For example it may assess and compare the total mass or volume of the pieces of chocolate in an ice cream.

In some embodiments, the electronic processing unit assesses and compares the total volume of the primary volumes 9 of a same type inside the product 2. For example it may assess and compare the total volume of tomatoes present in a tin of peeled tomatoes.

In some embodiments, the electronic processing unit, by assessing the shape of the primary volumes 9, or the presence of air zones inside them, and comparing those properties with saved reference values (respectively the correct shape and the maximum size of any air zones) assesses the integrity of one or more primary volumes 9 relative to a predetermined shape which those one or more primary volumes 9 should have.

In some embodiments, the electronic processing unit determines the presence, in predetermined zones of the product 2, of residual primary volumes 9 with density different from an expected density.

In some embodiments, the electronic processing unit assesses the presence of residual primary volumes 9 which are not expected for the product 2.

Whilst in some embodiments the assessment and comparison steps are performed as two successive steps, in which the electronic processing unit proceeds with quantitative assessments, in other embodiments the assessment and comparison steps may be performed simultaneously and in such a way that they are not separate. In the latter case in particular the electronic processing unit comprises a neural network, or respectively a deep neural network, programmed to simultaneously perform the assessment and comparison steps, processing the virtual three-dimensional tomography model 8 generated during the segmentation step.

Since, as already indicated, the tomography apparatus 1 disclosed is specifically intended for inspecting products 2 of known type, for each predetermined property to be inspected, the neural network, or respectively the deep neural network, is a network which must be trained in advance by supplying it with specific training input and output data. The input data will comprise a first and a second plurality of virtual three-dimensional tomography models processed by performing the same segmentation step which the electronic processing unit is programmed to perform. The virtual three-dimensional tomography models of the first plurality are models for which the predetermined properties to be inspected correspond to the reference predetermined properties. In contrast, the virtual three-dimensional tomography models of the second plurality are models for which the predetermined properties do not correspond to the reference predetermined properties.

Since the products 2 are of known type and must always have the same features, on one hand it is easy to have available the models of the first group, and, on the other hand, it is relatively simple to specially create "faulty" products 2 in order to obtain the models of the second group.

It will be possible for the training output data to simply consist of a definition of product 2 with predetermined properties corresponding or not corresponding to the reference predetermined properties, or said data may even consist of identification of the zone of the product 2 for which there is no match.

Finally, during the classification step the electronic processing unit supplies an indication about the result of the comparison step, and in particular about whether or not the comparison step identified a match for the predetermined properties which have been assessed.

Depending on the embodiments, the indication may be supplied in many different ways. In particular it may be supplied to an operator by means of a screen, or it may be transmitted to other apparatuses of the plant in which the apparatus is mounted. Moreover, it may be saved in combination with the data about that product 2.

FIGS. 1 to 5 show in the form of rendering, different aspects of a virtual three-dimensional tomography model 8 of a tub of ice cream, which comprises various primary parts: the tub, the lid, the ice cream, pieces of chocolate distributed in the ice cream, sour black cherries as a garnish on top of the ice cream and a syrup as a garnish also positioned on top of the ice cream.

Figures 1, 2, 3:
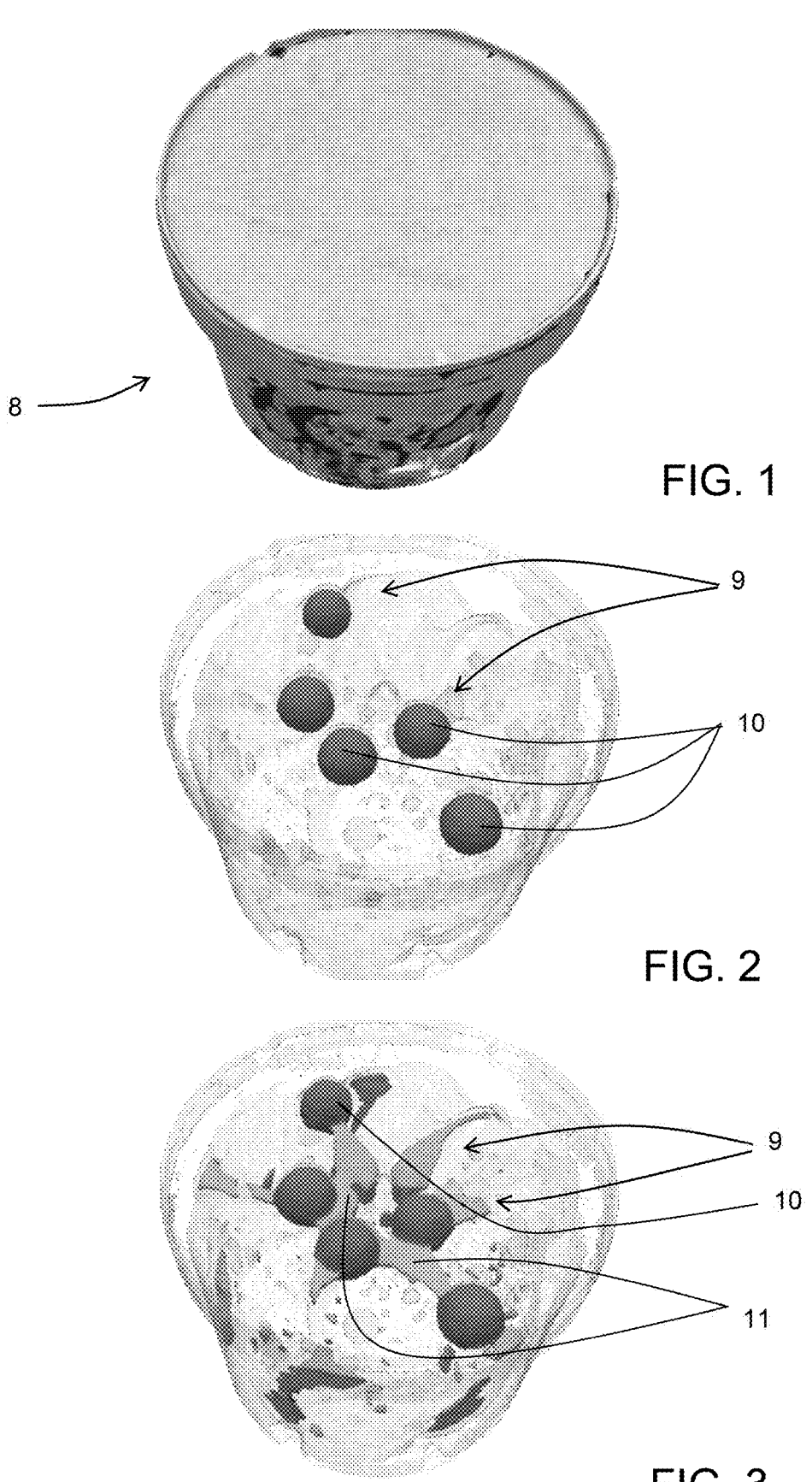
FIG. 1 shows a virtual three-dimensional tomography model of a product constituted of a single-portion tub of ice cream.
FIGS. 2 to 5 show four different segmentations of the virtual three-dimensional tomography model of FIG. 1.

FIG. 1 shows the model of the tub as a whole.

FIG. 2 shows the result of a segmentation in which the primary volumes 9 which correspond to the sour black cherries 10 have been identified.

FIG. 3 shows the result of a second segmentation in which, in addition to the sour black cherries, the syrup 11 has also been identified.

Figure 4:
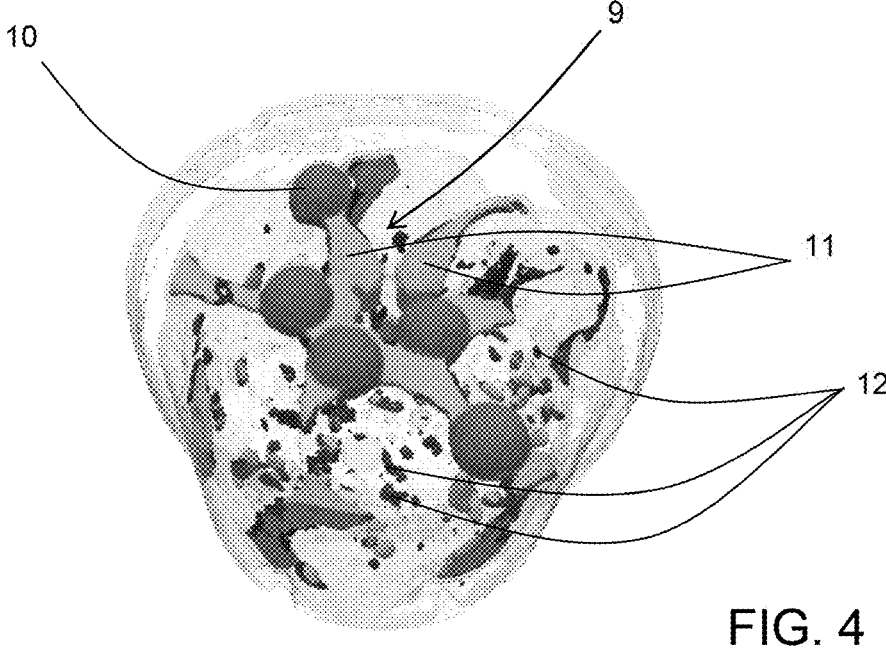

FIG. 4 shows the result of a further segmentation in which the pieces of chocolate 12 have also been identified.

It should be noticed that in FIGS. 2, 3 and 4 both the tub, and the ice cream are shown as slightly transparent with the sole aim of making the effect of the segmentation clearer.

Figure 5:
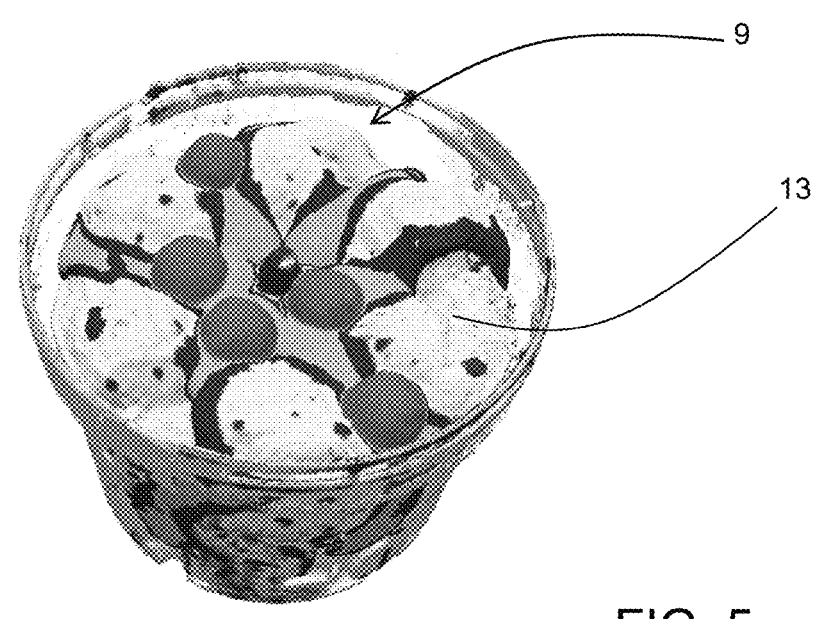

Finally, FIG. 5 shows the result of a further step in which the primary part constituted of the ice cream 13 has also been identified (notice that in the upper part of the ice cream not all of the pieces of chocolate shown in FIG. 4 are now visible, only the surface pieces).

FIG. 8 shows a top view of the virtual three-dimensional tomography model 8 of a pack of crispbreads. For execution of the inspection procedure, in the case of a product 2 of this type (in which the orientation of the internal primary parts is known) it is advantageous to orient the virtual three-dimensional tomography model 8 in such a way as to align the individual crispbreads (or, in general, the individual main parts) with the main axes. Therefore, it is possible to identify the virtual three-dimensional tomography models of the various crispbreads; the separation between the various crispbreads is easy to determine by calculating the average density of the crispbreads of the image and distinguishing between what has an above average density (crispbreads) and what has a below average density (air). Alternatively, the density values to be searched for may in any case even be predicted beforehand.

FIGS. 9 and 10 show the difference between the model of a broken crispbread and that of an intact crispbread (FIG. 11).

In the case of a broken crispbread, the zones where the breakage is located have a lower than average density. Moreover, their extent is greater than that of air bubbles which may be found in the crispbread, and/or they extend between two edges. Consequently, it is possible to identify the breakage zones either by identifying the low density zones, which have an extent greater than a predetermined threshold (area 14 in FIG. 10), or by identifying the low density zones, which extend without interruption between two edges of the crispbread.

FIGS. 12 and 13 relate to a product 2 constituted of a packet of mixed dried fruit and nuts, which contains peanuts, almonds and raisins. FIG. 12 shows a vertical section of the relative virtual three-dimensional tomography model 8, whilst FIG. 13 shows the result of a triple segmentation of the model, performed to identify the three types of dried fruit and nuts.

In FIG. 13 the letter "u" indicates raisins: this is the type of fruit with the greatest density and may be distinguished from the others simply on the basis of that parameter. The letter "a" indicates the peanuts, whilst the letter "m" indicates the almonds. Since the density of peanuts and almonds is very similar and it is not possible to differentiate between the two types of nuts only based on this parameter, it was necessary to also refer to the information known beforehand about the shape and the dimensions of the two types of nuts; in fact the peanuts are smaller than the almonds.

In other embodiments of this invention, in contrast the electronic processing unit comprises a neural network or a deep neural network which perform the entire inspection procedure (therefore, not just the assessment and comparison steps as in the case previously described).

The neural network, or respectively the deep neural network, is programmed to process the entire virtual three-dimensional tomography model 8 in order to establish whether or not the one or more predetermined properties to be inspected correspond to the reference predetermined properties. For that purpose, for each predetermined property to be inspected, the neural network, or respectively the deep neural network, was trained in advance by supplying them with specific training input and output data. The input data will comprise a first and a second plurality of virtual three-dimensional tomography models.

The virtual three-dimensional tomography models of the first plurality are models for which the predetermined properties to be inspected correspond to the reference predetermined properties. In contrast, the virtual three-dimensional tomography models of the second plurality are models for which the predetermined properties do not correspond to the reference predetermined properties.

In this case too, as in that previously described, obtaining the models of the first and second pluralities necessary as input data is simple.

As in the preceding case, it will be possible for the training output data to simply consist of a definition of product 2 with predetermined properties corresponding or not corresponding to the reference predetermined properties, or said data may even consist of identification of the zone of the product 2 for which there is no match.

The context of this invention covers both the tomography apparatus 1 itself, and a plant 14 for the industrial production of products 2, which includes it.

In general the plant 14 comprises a production line 15, along which one or more product 2 preparation stations 16 are mounted one after another. In the context of this invention preparation station 16 means any station which performs any processing on the product 2, whether it is a station for adding primary parts, for assembly, processing, packaging, etc.

An industrial tomography apparatus 1 according to what is described above is mounted along the production line 15 downstream of at least one preparation station 16 for the product 2, advantageously downstream of one or more preparation stations 16 in which operations are performed which may have an effect on the predetermined properties to be inspected.

In some embodiments, at the end of the inspection procedure the electronic processing unit classifies the product 2 as conforming or non-conforming based on the predetermined properties assessed.

In some embodiments the electronic processing unit, at the end of the inspection procedure, classifies a product 2 as non-conforming when the comparison step has identified one or more failures to match.

In some embodiments the electronic processing unit, at the end of the inspection procedure, classifies a product 2 as non-conforming when the comparison step has identified, not just a failure to match, but also a difference, between the predetermined properties assessed and the corresponding reference values, which is above a maximum tolerance value.

For example, a product 2 (such as an ice cream) may in any case be considered conforming when the non-conformity relates only to part of the predetermined properties inspected (for example, no more than two of ten) and the difference between the predetermined properties assessed and the corresponding reference values does not exceed 10% of the reference value.

Moreover, in some embodiments, downstream of the industrial tomography apparatus 1, the plant 14 comprises an ejection station 17 configured to expel non-conforming products 2 from the production line 15 and to send them along a rejection or recovery path 18. Therefore, the electronic processing unit is connected (directly or indirectly) to the ejection station 17 for communicating to the ejection station 17 which products 2 have been classified as non-conforming. The plant 14 will also be equipped with a tracking system for the position of each individual product 2 along the production line 15 in such a way as to be able to precisely establish when each product 2 inspected by the industrial tomography apparatus 1, arrives in the ejection station 17. The industrial tomography apparatus 1 and the ejection station 17 may be positioned either at the end of the production line 15 (FIG. 15) or at a position in the middle of it (FIG. 16).

In some embodiments, alternatively or in addition to classification of the product 2 as conforming or non-conforming, the plant 14 comprises a checking system connected to the electronic processing unit for receiving from it information about the predetermined properties assessed. When the electronic processing unit supplies, for a plurality of distinct products 2, a same indication of failure to match one or more predetermined properties assessed, the checking system is also configured to modify the operating parameters of the one or more preparation stations 16 for the product 2 (for example to reduce the quantity of syrup supplied on an ice cream if for a series of successive verifications the quantity proved to be excessive).

In some embodiments, the checking system is connected to the electronic processing unit in order to receive from it the indication of whether or not the comparison step has identified a match for the predetermined properties assessed.

Moving on to the method for checking the composition of industrial products 2 which comprise a plurality of primary parts in accordance with this invention, many aspects of it may be inferred from the above description of the apparatus.

It comprises first a tomography scan step, in which, using a tomography apparatus 1 inserted in a production line 15, a computed tomography scan of the product 2 is performed and a virtual three-dimensional tomography model 8 of it is obtained, constituted of a plurality of voxels, each of which is assumed to have its own constant density.

Then a step of computerised analysis of the virtual three-dimensional tomography model 8 is performed, for assessment of predetermined properties of the primary parts of the product 2 to which the virtual three-dimensional tomography model 8 corresponds.

Obviously, the predetermined properties assessed may be the same as previously indicated.

In some embodiments, the computerised analysis step comprises a segmentation step, an assessment step, a comparison step and a classification step whose operations correspond to those described above with reference to programming of the electronic processing unit.

In other embodiments, the computerised analysis step is wholly or partly implemented by means of neural networks, or deep neural networks, similarly to what was described above with reference to the apparatus.

This invention brings important advantages.

In fact, thanks to this invention it has been possible to provide an apparatus and a method which allow systematic checking of the composition of the whole production of industrial products 2 of known type.

Second, thanks to this invention it is possible to verify with good precision, for each product 2, the correct positioning relative to each other of the various primary parts and/or the correct quantity of each type of primary parts and/or the integrity of the various primary parts and/or the presence of the correct primary parts and/or the absence of elements which are not expected.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An industrial tomography apparatus (1) comprising:
   a conveying device (3), configured to feed to a scanning zone (4), and respectively remove from the scanning zone (4), a product (2) to be inspected;
   a tomography scan device (7) configured to perform tomography scans of the product (2) placed in the scanning zone (4); and
   an electronic processing unit operatively connected to the tomography scan device (7) for receiving from the tomography scan device (7) digital data about the tomography scans performed by the tomography scan device (7), and programmed to generate, using that digital data, a virtual three-dimensional tomography model (8) of the product (2) scanned by the tomography scan device (7), the virtual three-dimensional tomography model (8) being constituted of a plurality of voxels, each of which has its own constant density, and representing the internal structure of the product (2);
   and wherein the electronic processing unit is also programmed to perform a procedure for inspecting the composition of products (2) of known type comprising a plurality of primary parts and having known features, wherein for the products (2) of known type the known features reflect the production and/or packaging specifications, and wherein during the inspection procedure the electronic processing unit inspects the virtual three-dimensional tomography model (8) to assess at least one of the following predetermined properties of the product (2): the position of one or more primary parts inside the product (2) and the total number of primary parts of a same type inside the product (2).

2. A plant (14) for the industrial production of products (2) comprising a plurality of primary parts, comprising a production line (15) along which one or more product (2) preparation stations (16) are mounted one after another, and at least one industrial tomography apparatus (1) according to claim 1 mounted along the production line (15) downstream of at least one preparation station (16) for the product (2).

3. The plant (14) according to claim 2, wherein, at the end of the inspection procedure, the electronic processing unit classifies a product (2) as conforming or non-conforming based on the predetermined properties assessed, wherein the plant (14), downstream of the industrial tomography apparatus (1) comprises an ejection station (17) configured to expel non-conforming products (2) from the production line (15), and wherein the electronic processing unit is connected to the ejection station (17) for communicating to the ejection station (17) which products (2) have been classified as non-conforming.

4. The plant (14) according to claim 3, wherein the plant (14) comprises a checking system connected to the electronic processing unit, and wherein the checking system is configured to modify operating parameters of the one or more preparation stations (16), when the electronic processing unit supplies, for a plurality of distinct products (2), a same indication of failure to match one or more predetermined properties assessed.

5. The plant (14) according to claim 4, wherein the checking system is connected to the electronic processing unit in order to receive from it the indication of whether or not the comparison step has identified a match for the predetermined properties assessed.

6. The plant (14) according to claim 2, wherein the plant (14) comprises a checking system connected to the electronic processing unit, and wherein the checking system is configured to modify operating parameters of the one or more preparation stations (16), when the electronic processing unit supplies, for a plurality of distinct products (2), a same indication of failure to match one or more predetermined properties assessed.

7. The plant (14) according to claim 6, wherein the checking system is connected to the electronic processing unit in order to receive from it the indication of whether or not the comparison step has identified a match for the predetermined properties assessed.

8. A method for checking the composition of industrial products (2) which comprise a plurality of primary parts and have known features, wherein the known features reflect the production and/or packaging specifications, the method comprising the following operating steps:

a tomography scan step, wherein, using a tomography apparatus (1) inserted in a production line (15), a computed tomography scan of the product (2) is performed and a virtual three-dimensional tomography model (8) of the product (2) is obtained, the three-dimensional tomography model (8) being constituted of a plurality of voxels, each of which has its own constant density, and representing the internal structure of the product (2); and a step of computerised analysis of the virtual three-dimensional tomography model (8), for assessment of predetermined properties of the primary parts of the product (2) to which the virtual three-dimensional tomography model (8) corresponds, chosen between the position of one or more primary parts inside the product (2) and the total number of primary parts of a same type inside the product (2).

9. The method according to claim 8 wherein the industrial products (2) are food products.

* * * * *